(12) United States Patent
Arai et al.

(10) Patent No.: US 9,753,536 B2
(45) Date of Patent: Sep. 5, 2017

(54) ELECTRONIC DEVICE

(75) Inventors: Izumi Arai, Kawasaki (JP); Ryosuke Kobayashi, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/001,490

(22) PCT Filed: Feb. 24, 2012

(86) PCT No.: PCT/JP2012/001296
§ 371 (c)(1),
(2), (4) Date: Aug. 23, 2013

(87) PCT Pub. No.: WO2012/114772
PCT Pub. Date: Aug. 30, 2012

(65) Prior Publication Data
US 2013/0335210 A1    Dec. 19, 2013

(30) Foreign Application Priority Data
Feb. 24, 2011    (JP) ................................. 2011-039049

(51) Int. Cl.
*G08B 6/00*      (2006.01)
*G06F 3/01*      (2006.01)
(Continued)

(52) U.S. Cl.
CPC .......... *G06F 3/016* (2013.01); *G06F 3/03547* (2013.01); *G06F 3/0414* (2013.01)

(58) Field of Classification Search
None
See application file for complete search history.

(56) References Cited

U.S. PATENT DOCUMENTS

| 7,292,227 B2 | 11/2007 | Fukumoto et al. |
| 2001/0026625 A1 | 10/2001 | Azima et al. |

(Continued)

FOREIGN PATENT DOCUMENTS

| JP | 2002-149312 A | 5/2002 |
| JP | 2002-533957 A | 10/2002 |

(Continued)

OTHER PUBLICATIONS

International Search Report; PCT/JP2012/001296; Apr. 3, 2012.
(Continued)

*Primary Examiner* — Julie Lieu
(74) *Attorney, Agent, or Firm* — Studebaker & Brackett PC

(57) ABSTRACT

An electronic device causing flexure vibration of touch panel, to allow for preventing vibration from attenuated and providing sufficient water and dust proofness, the device includes touch panel 20, vibration unit 80 that vibrates touch panel 20, and upper housing 10a that covers peripheral portion of upper surface of touch panel 20, such that inwardly-extending roof portion 10a-2 is provided around periphery of top portion of upper housing 10a, a surface of touch panel 20 is surrounded by elastic member 60 except for upper surface area of touch panel 20 corresponding to opening 10a-1 and area of vibration unit 80 on touch panel 20, and contact is established between elastic member on peripheral portion of upper surface of touch panel 20 and roof portion 10a-2 and/or between elastic member on peripheral portion of bottom surface of touch panel 20 and support member 10b of touch panel 20.

3 Claims, 6 Drawing Sheets

(51) Int. Cl.
*G06F 3/041* (2006.01)
*G06F 3/0354* (2013.01)

(56) References Cited

U.S. PATENT DOCUMENTS

| | | | |
|---|---|---|---|
| 2005/0002537 A1 | 1/2005 | Azima et al. | |
| 2005/0129267 A1 | 6/2005 | Azima et al. | |
| 2010/0225600 A1* | 9/2010 | Dai | G06F 3/016 345/173 |
| 2010/0245254 A1* | 9/2010 | Olien | G06F 3/041 345/173 |
| 2010/0315354 A1* | 12/2010 | Park | G06F 3/041 345/173 |
| 2011/0050598 A1* | 3/2011 | Park | G06F 1/1626 345/173 |
| 2011/0102342 A1* | 5/2011 | Iwawaki et al. | 345/173 |
| 2011/0102343 A1* | 5/2011 | Imai | G06F 1/1643 345/173 |
| 2012/0162143 A1* | 6/2012 | Kai | G06F 1/1626 345/177 |
| 2012/0242593 A1* | 9/2012 | Kim | G06F 3/016 345/173 |
| 2013/0300265 A1* | 11/2013 | Senatori | 312/7.2 |
| 2013/0328820 A1* | 12/2013 | Kondoh et al. | 345/173 |
| 2013/0335211 A1* | 12/2013 | Kobayashi | 340/407.2 |
| 2014/0176318 A1* | 6/2014 | Kono | 340/407.2 |

FOREIGN PATENT DOCUMENTS

| | | |
|---|---|---|
| JP | 2010-044497 A | 2/2010 |
| JP | 2010-114866 A | 5/2010 |

OTHER PUBLICATIONS

An Office Action; "Notice of Reason for Rejection," issued by the Japanese Patent Office on Nov. 26, 2013, which corresponds to Japanese Patent Application No. 2013-500912 and is related to U.S. Appl. No. 14/001,490; with English language concise explanation.
An Office Action; "Notice of Reason for Rejection," issued by the Japanese Patent Office on Jun. 17, 2014, which corresponds to Japanese Patent Application No. 2013-500912 and is related to U.S. Appl. No. 14/001,490; with English language concise explanation.

* cited by examiner

ELECTRONIC DEVICE

CROSS-REFERENCES TO RELATED APPLICATIONS

This application claims priority to and the benefit of Japanese Patent Application No. 2011-039049 filed on Feb. 24, 2011, the entire contents of which are incorporated herein by reference.

FIELD

The present invention relates to an electronic device that includes a panel forming an external appearance of the device and that vibrates the panel.

BACKGROUND

Currently, a wide range of electronic devices adopt touch panels and touch pads as input devices. For example, Patent Literature 1 proposes an input device in which, when an operator operates the touch panel or the touch pad, the touch panel or the touch panel undergoes flexure vibration to thereby provide the operator with an operational feeling on the finger or the like as a feedback.

CITATION LIST

Patent Literature 1: Japanese Patent Application Publication No. 2010-44497

SUMMARY

In the electronic device according to Patent Literature 1, there are no measures taken to prevent dust or water from entering the device. Accordingly, dust or water can enter, for example, through a gap between the touch panel and a member for fixing the touch panel.

The above problem is commonly found in any electronic device that includes a panel forming an external appearance of the device and that vibrates the panel. Another example of such an electronic device that vibrates a panel is the one in which the panel is vibrated by application of a predetermined electric signal (sound signal), and the vibration is transmitted to a portion of a user's body (e.g. a cartilaginous portion of the external ear) that is in contact with the panel, so that sound is transmitted to the user. Yet another example of the electronic device that vibrates a panel is the one provided with a function of removing, by the panel vibration, a waterdrop and a smudge that have been attached to the panel.

In view of the above, the present invention is to make the vibration of the panel less likely to be interfered with and to enhance dust-proofness and water-proofness in the electronic device that includes a panel constituting the appearance of the device and that vibrates the panel.

One aspect of the present invention provides an electronic device including: a panel; a vibration unit configured to vibrate the panel; and an upper housing configured to cover a peripheral portion of an upper surface of the panel, such that an inwardly-extending roof portion is provided around an entire periphery of a top portion of the upper housing, an entire surface of the panel is surrounded by an elastic member except for an upper surface area of the panel that corresponds to an opening of the upper housing and an area of the panel where the vibration unit is disposed, and tight contact is established at least one of between the elastic member on the peripheral portion of the upper surface of the panel and the roof portion and between the elastic member on a peripheral portion of a bottom surface of the panel and a support member of the panel.

According to the present invention, the electronic device including a panel forming the external appearance of the device and vibrating the panel is achieved in which the vibration of the panel is less likely to be interfered with and in which dust-proofness and water-proofness is enhanced.

BRIEF DESCRIPTION OF DRAWINGS

The present invention will be further described below with reference to the accompanying drawings, wherein.

DESCRIPTION OF EMBODIMENTS

Figure 1:
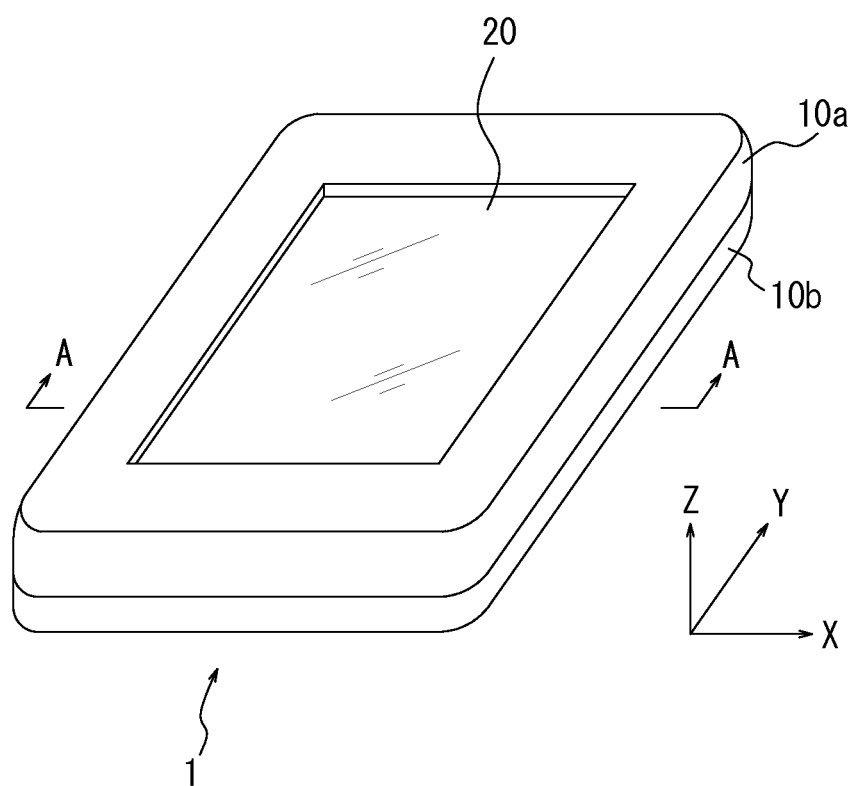
FIG. 1 is a perspective view of an electronic device according to one embodiment of the present invention.

Embodiments of the present invention will be described with reference to the accompanying drawings. FIG. 1 is a perspective view of an electronic device according to an embodiment of the present invention.

As illustrated in FIG. 1, an electronic device 1, from a standpoint of an external appearance, includes an upper housing 10a, a lower housing 10b, and a touch panel 20. Note that the phrase "touch panel" refers to a member disposed in front of a display unit such as an LCD or the like. That is to say, the touch panel refers to a member provided separately from the display unit.

The upper housing 10a and the lower housing 10b are configured to be integrally combined to form a housing 10. Between the upper housing 10a and the lower housing 10b when the housings 10a and 10b are integrally combined, appropriate water-proofing and dust-proofing measures are taken, by sealing the housings 10a and 10b by a rubber packing, for example. The upper housing 10a and the lower housing 10b are preferably made of a material that is capable of withstanding a certain level of shock. For example, the housings 10a and 10b may be resin cases. In the description below, a detailed description of the combined structure of the upper housing 10a and the lower housing 10b is omitted.

The touch panel 20 is typically disposed in front of the display unit (not illustrated) and is configured to detect a contact that has been made to an object displayed on the display unit by a finger of an operator, a stylus pen, or the like (referred to below simply as a "contacting object") on a corresponding touch face of the touch panel 20. The touch panel 20 is also configured to detect a position of the contact that has been made to the touch face by the contacting object and to notify a control unit (not illustrated) of the detected contact position.

The touch panel 20 may be a resistive film type, a capacitive type, an optical type and the like. Note that a physical contact to the touch panel 20 by the contacting object is not necessarily required in terms of the detection of the contact by the contacting object. For example, when the touch panel 20 is the optical type, it is not necessary for the contacting object to make contact with the touch panel 20 since the touch panel 20 detects a position on the touch panel 20 where an infrared ray is disturbed by the contacting object.

The aforementioned display unit graphically displays an object of a push button switch (push-type button switch) or the like, such as a key. The object refers to an image for suggesting to the operator an area to be touched on the touch face of the touch panel 20. The push button switch refers to a button, a key, or the like (collectively referred to below simply as a "key etc.") that the operator uses for an input operation. The display unit may be configured using, for example, a liquid crystal display (LCD) panel, an organic EL display panel, and the like.

Figure 2:
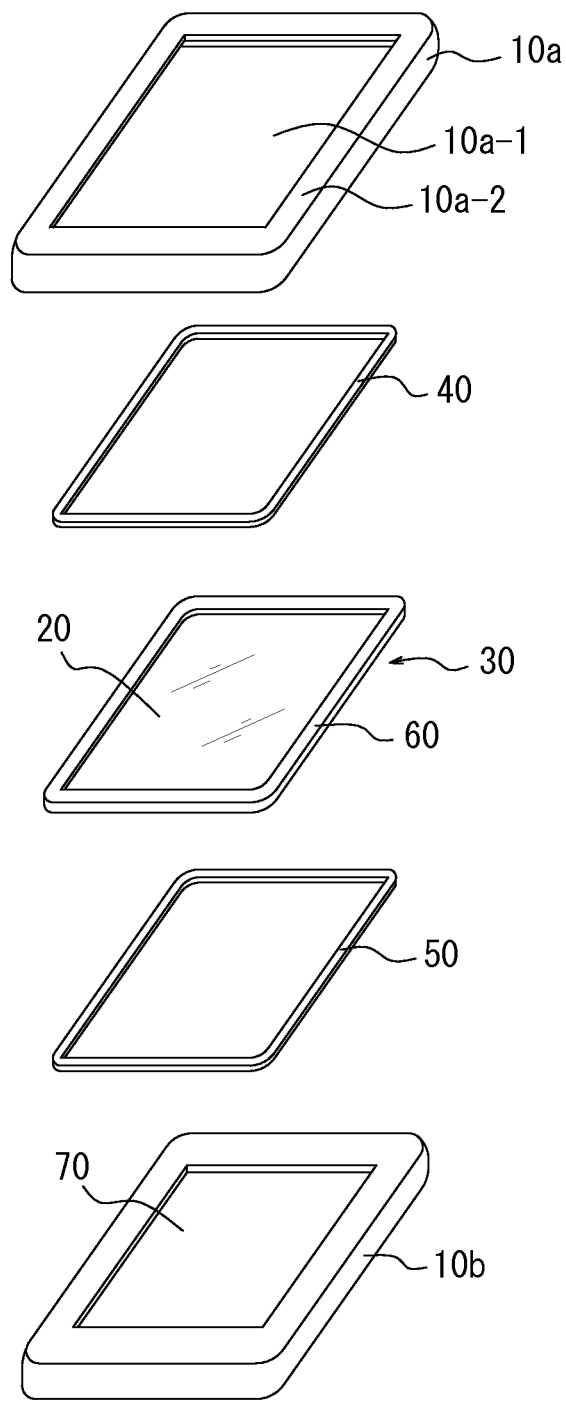
FIG. 2 is an exploded perspective view of an electronic device according to one embodiment of the present invention.

FIG. 2 is an exploded perspective view of the electronic device 1 illustrated in FIG. 1 in which the device 1 is disassembled into the upper housing 10*a*, the lower housing 10*b*, a touch panel assembly 30, an upper PET sheet 40, and a lower PET sheet 50.

As illustrated in FIG. 2, the touch panel assembly 30 is interposed between the upper housing 10*a* and the lower housing 10*b*, and the upper PET sheet 40 and the lower PET sheet 50 are interposed between the touch panel assembly 30 and the upper housing 10*a* and between the touch panel assembly 30 and the lower housing 10*b*, respectively.

Here, the touch panel assembly 30 includes the touch panel 20, an elastic member 60, and a vibration unit (not illustrated here) which is later described. The elastic member 60 surrounds substantially an entire surface of the touch panel 20, except for an upper surface area of the touch panel 20 that corresponds to an opening 10*a*-1 of the upper housing 10*a* and an area of the touch panel 20 where the vibration unit is disposed.

There is also provided an inwardly-extending roof portion 10*a*-2 around an entire periphery of a top portion of the upper housing 10*a*, so that a peripheral portion of the upper surface of the touch panel 20 is covered by the upper housing 10*a*. Here, the peripheral portion of the upper surface of the touch panel 20 refers to a marginal area on the upper surface of the touch panel 20, preferably including a width ranging substantially from 2 mm to 3 mm.

In the present embodiment, the elastic member 60 on the peripheral portion of the upper surface of the touch panel 20 is in tight contact with the roof portion 10*a*-2 of the upper housing 10*a* via the upper PET sheet 40 having a frame shape. In this regard, for the sake of improved air tightness, the upper PET sheet 40 may be secured on upper and lower surfaces thereof to the roof portion 10*a*-2 of the upper housing 10*a* and the elastic member 60, respectively, with use of a waterproof double-sided adhesive tape, for example.

It is also preferable to provide the lower PET sheet 50 having the frame shape, between the elastic member 60 on a peripheral portion of a bottom surface of the touch panel 20 and the lower housing 10*b*. In this regard, the peripheral portion of the bottom surface of the touch panel 20 refers to a marginal area on the bottom surface of the touch panel 20, preferably including the width ranging substantially from 2 mm to 3 mm, as similarly to the case of the peripheral portion of the upper surface of the touch panel 20. In this regard, it is more advantageous to secure the lower PET sheet 50 on an upper surface and a lower surface thereof to the elastic member 60 and the lower housing 10*b*, respectively, with use of the waterproof double-sided adhesive tape, for example.

Note that, although the aforementioned upper PET sheet 40 and the lower PET sheet 50 are preferably used in adjusting a position of the touch panel 20 in a vertical direction (i.e. in a Z-direction in FIG. 1), the PET sheets 40 and 50 are not indispensable and may be omitted.

The lower housing 10*b* is provided with a recessed portion, where the display unit 70 such as the LCD is disposed. On the bottom surface of the display unit 70, a substrate which is not illustrated is provided.

Figure 3:
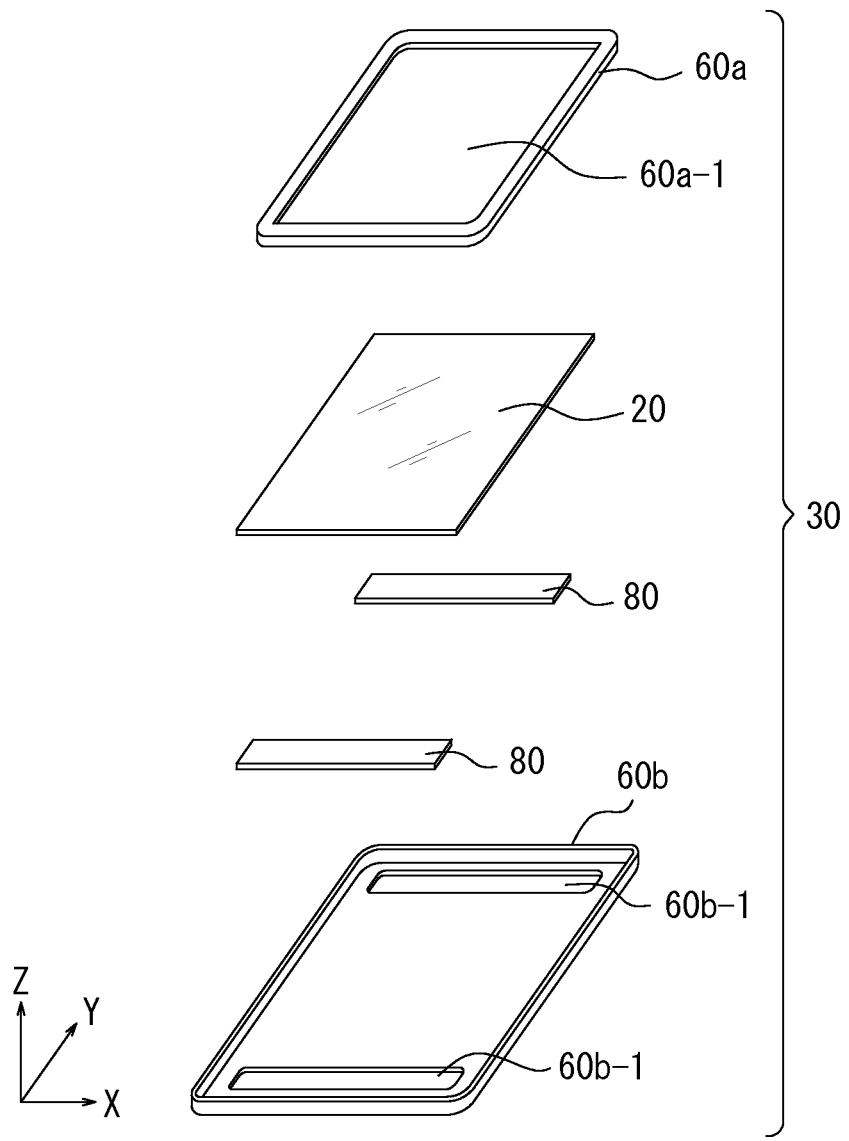
FIG. 3 is a detail perspective view of an electronic device according to one embodiment of the present invention.

FIG. 3 is an exploded perspective view of the touch panel assembly 30 illustrated in FIG. 2 in which the touch panel assembly 30 is disassembled into the touch panel 20, the vibration unit 80, the upper elastic member 60*a*, and the lower elastic member 60*b*.

As illustrated in FIG. 3, the vibration units 80 are positioned on the bottom surface of the touch panel 20 at locations near the edges along an X-direction in the figure. The vibration units 80 may be configured using piezoelectric elements, for example.

The positioning of the vibration units 80 is not limited to the locations near the edges along the X-direction of the touch panel 20 in the figure, and the vibration units 80 may be positioned at locations near the edges along a Y-direction of the touch panel 20 in the figure, for example.

Each vibration unit 80 provides a tactile sensation to the contacting object that is in contact with the touch face, by generating vibration according to a predetermined vibration pattern. In the present embodiment, the vibration unit 80 generates the vibration based on a drive signal received from the control unit that is not illustrated, for example.

The upper elastic member 60*a* and the lower elastic member 60*b* are configured to form the elastic member 60 illustrated in FIG. 2 by sandwiching the touch panel 20 in therebetween. It is to be noted that the elastic member 60 is preferably made of material with sufficient water-proofness and dust-proofness and with appropriate elasticity, and a gel-like material (e.g. silicon gel), silicon rubber, and the like are advantageously adapted.

The upper elastic member 60*a* includes an opening 60*a*-1 in correspondence with the opening 10*a*-1 of the upper housing 10*a*, and the lower elastic member 60*b* includes openings 60*b*-1 in correspondence with the vibration units 80. Thus, when the touch panel 20 is sandwiched between the upper elastic member 60*a* and the lower elastic member 60*b*, substantially the entire surface of the touch panel 20 is surrounded by the elastic member 60, except for the upper surface area of the touch panel 20 that corresponds to the opening 10*a*-1 of the upper housing 10*a* and the area of the touch panel 20 where the vibration unit 80 is disposed. The upper elastic member 60*a* and the lower elastic member 60*b* are integrated when adhered together by an adhesive agent, for example. Although the present embodiment describes the elastic member 60 divided into the two members in the form of the upper elastic member 60*a* and the lower elastic member 60*b*, the present invention is not limited to the embodiment. For example, the elastic member 60 may be a single-form member which may be elastically deformed so as to fit the touch panel 20 in the elastic member 60.

In the following, a description is given in detail of an internal structure of the electronic device according to the embodiment of the present invention.

Figure 4:
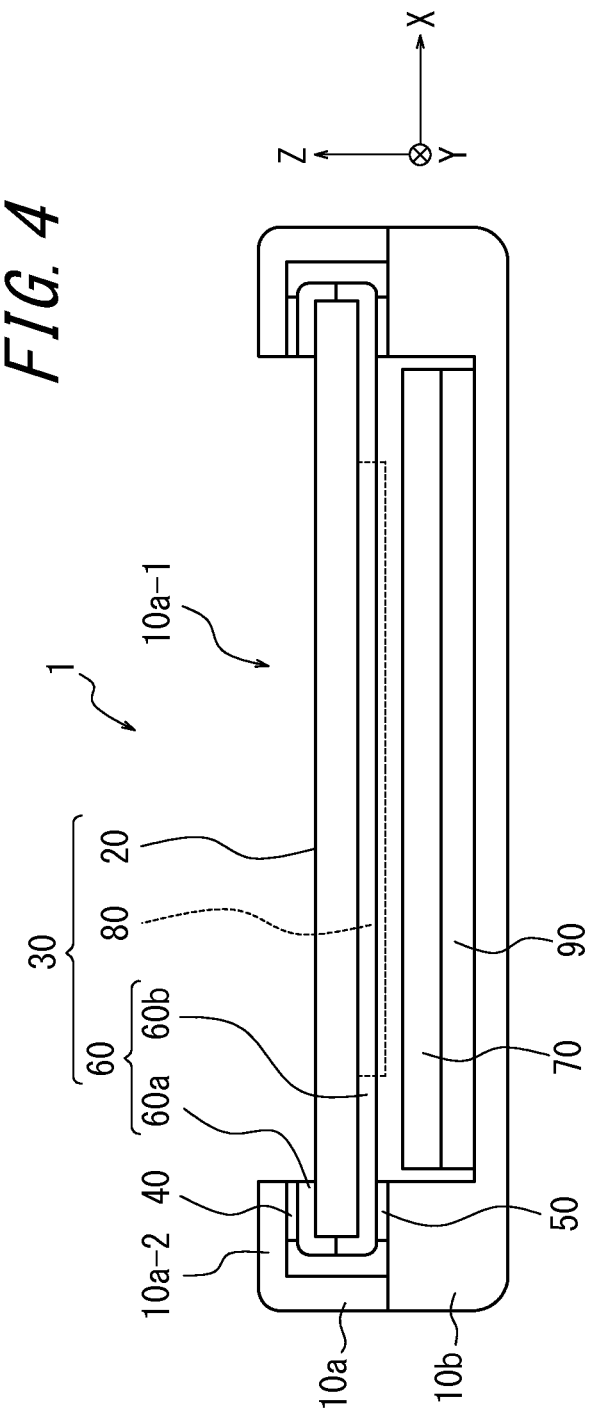
FIG. 4 is a sectional view of an electronic device according to one embodiment of the present invention.

FIG. 4 is a sectional view of the electronic device 1 taken along a line A-A of FIG. 1. The following describes an example where the electronic device has a symmetrical structure. Therefore, in FIG. 4, reference numerals for depicting the structure on a right side of the figure are omitted.

As illustrated in FIG. 4, in the present embodiment, the touch panel assembly 30 is disposed in the electronic device 1, with the elastic member on the peripheral portion of the upper surface of the touch panel 20 being in tight contact with the roof portion 10a-2 of the upper housing 10a via the upper PET sheet 40, and with the elastic member on the peripheral portion of the bottom surface of the touch panel 20 being in tight contact with the lower housing 10b, which serves as the support member of the touch panel 20, via the lower PET sheet 50.

The PET sheets 40 and 50 do not necessarily need to be provided, as described above, and the elastic member on the peripheral portion of the upper surface of the touch panel 20 may be in direct tight contact with the roof portion 10a-2 of the upper housing 10a, and the elastic member on the peripheral portion of the bottom surface of the touch panel 20 may be in direct tight contact with the lower housing 10b.

Alternatively, contact may be established either between the elastic member on the peripheral portion of the upper surface of the touch panel 20 and the roof portion 10a-2 of the upper housing 10a or between the elastic member on the peripheral portion of the bottom surface of the touch panel 20 and the lower housing 10b.

As described above, the elastic member on the peripheral portion of the upper surface of the touch panel 20 is in tight contact with the roof portion 10a-2 of the upper housing 10a. By doing so, the upper elastic member 60a of the peripheral portion of the upper surface of the touch panel 20 prevents (i.e. seals out) ambient air from entering the electronic device from a gap between the peripheral portion of the upper surface of the touch panel 20 and the roof portion 10a-2 of the upper housing 10a. As a result, water-proofness and dust-proofness of the electronic device 1 is achieved.

Similarly, as described above, the elastic member on the peripheral portion of the bottom surface of the touch panel 20 is in tight contact with the lower housing 10b, and by doing so, sealing is established between the peripheral portion of the bottom surface of the touch panel 20 and the lower housing 10b. As a result water-proofness and dust-proofness of the electronic device 1 is achieved.

Note that, when the upper PET sheet 40 and the lower PET sheet 50 are provided, it is not always necessary to provide the upper PET sheet 40 and the lower PET sheet 50 seamlessly all around the entire peripheral portion of the upper surface and the entire peripheral portion of the bottom surface of the touch panel 20. That is to say, one of the upper PET sheet 40 and the lower PET sheet 50 may be provided intermittently. When the upper PET sheet 40 is provided all around the entire peripheral portion of the upper surface of the touch panel 20, a function of blocking ambient air is additionally achieved between the peripheral portion of the upper surface of the touch panel 20 and the roof portion 10a-2 of the upper housing 10a. Similarly, when the lower PET sheet 50 is provided all around the entire peripheral portion of the bottom surface of the touch panel 20, the function of blocking ambient air is additionally achieved between the peripheral portion of the bottom surface of the touch panel 20 and the lower housing 10b.

Furthermore, since the touch panel 20 is elastically supported at the peripheral portion of the upper surface thereof and the peripheral portion of the bottom surface thereof by the elastic member 60, the touch panel 20 is capable of causing the elastic member 60 to be deformed and undergoing flexure vibration, resulting in little attenuation in flexure vibration.

Moreover, since substantially the entire surface of the touch panel 20 is surrounded by the elastic member 60 except for the upper surface area of the touch panel 20 that corresponds to the opening 10a-1 of the upper housing 10a and the area of the touch panel 20 where the vibration unit 80 is disposed, even when the touch panel 20 is brought into contact with a peripheral component such as the display unit 70 due to external force applied during flexure vibration of the touch panel 20, a shock caused by the contact is absorbed by the elastic member 60. Consequently, a risk of damaging the touch panel 20 and the peripheral component is circumvented. Preferably, when the gel-like material (e.g. silicon gel), silicon rubber, and the like are used for the elastic member 60, a favorable shock absorption function is achieved.

Note that, although in the present disclosure the term "surround" may of course refer to states illustrated in FIGS. 3 and 4, the term also encompasses a state where the elastic member 60 is provided on an entire portion of the surface of the touch panel 20 that may be brought into contact with the peripheral component such as the display unit 70 due to the external force applied during flexure vibration of the touch panel 20.

Furthermore, in the present embodiment, the lower housing 10b corresponds to the support member. However, the support member is not limited to the lower housing 10b, and it is also possible to provide, as the support member, the upper housing 10a with a supporting portion extending to the bottom surface of the touch panel 20, for example. Alternatively, for example, widths of the recessed portion of the lower housing 10b and the display unit 70 may be increased so that the display unit 70 may replace the support member, or widths of the recessed portion of the lower housing 10b and the substrate 90 may be increased so that the substrate 90 may replace the support member.

Moreover, the present embodiment describes that the upper elastic member 60a on the peripheral portion of the upper surface of the touch panel 20 is in tight contact with the roof portion 10a-2 of the upper housing 10a. In this regard, the upper housing 10a may be divided into two members in the form of a bezel (i.e. a frame-shaped member) disposed above the peripheral portion of the upper surface of the touch panel 20 and a main body of the upper housing, for example. When the upper housing is divided into the two members, the aforementioned effect is achieved by establishing tight contact between the upper elastic member 60a on the peripheral portion of the upper surface of the touch panel 20 and the bezel.

According to the electronic device of the embodiment described above, by using the elastic member configured to surround substantially the entire surface of the touch panel except for the upper surface area of the touch panel that corresponds to the opening of the upper housing and the area of the touch panel where the vibration unit is disposed, attenuation in flexure vibration of the touch panel caused by the vibration unit is effectively reduced, and water-proofness and dust-proofness of the electronic device are enhanced. Besides, the elastic member absorbs the shock that can occur upon flexure of the touch panel between the touch panel and the peripheral component.

Note that the present invention is not limited to the above embodiment, and a variety of modifications and changes are possible. For example, the above embodiment describes the example where the object is displayed on the display unit (not illustrated) disposed on the bottom surface of the touch panel, and the touch panel detects a contact by the operator. However, the present invention is not limited to the embodiment, and it is also possible to adopt an embodiment which omits the display unit and directly prints the object by ink or the like on the touch face of the touch panel, for example.

The above embodiment describes the case with the touch panel where a contact made to the touch face of the touch panel is detected. In other words, in description of the above embodiment, it is assumed that the touch panel is a so-called touch sensor type member. However, any touch panel may be used in the electronic device according to the present invention as long as a contact can be made by the contacting object such as the finger of the operator and the stylus pen to the touch panel.

For example, the touch panel used in the electronic device according to the present invention may be simply a "panel-like" member that is not configured to detect a position of a contact made to the touch face by the contacting object (i.e. that does not have a sensing function). In the electronic device with such a structure, a pressure detection unit configured to detect a pressure applied to the touch panel may be additionally provided, and based on the pressure detected by the pressure detection unit, it may be determined that a contact has been made to the touch panel, for example.

Moreover, in the above embodiment, the touch panel is used, and a contact made on the touch face of the touch panel is detected. However, the pressure detection unit may determine the pressure applied to the touch panel, and it may be determined that a contact has been made to the touch panel based on the detected pressure.

The aforementioned pressure detection unit is configured to detect the pressure applied to the touch face of the touch panel and may be configured using any number of strain gauge sensors, piezoelectric elements, and the like whose physical or electric properties (e.g. strain, resistance, voltage, and the like) vary according to the pressure, for example. When the piezoelectric elements are used as the vibration unit, the piezoelectric elements may also be used as the pressure detection unit. With such a structure, it is also assumed to calculate, through the detection of strain of the touch panel due to the pressure, the pressure applied to the touch panel based on the detected strain.

For example, when the pressure detection unit is configured using the piezoelectric elements and the like, the electric properties, namely, the voltage (i.e. voltage value) of the piezoelectric elements of the pressure detection unit varies according to an amount of load (force) of the pressure applied to the touch face of the touch panel (or a speed, i.e. acceleration, at which the amount of load [force] changes). Under the circumstance, the pressure detection unit is configured to be capable of notifying the control unit of the voltage (i.e. voltage value, which is referred to below simply as data). The control unit acquires the data from the pressure detection unit configured to notify the control unit of the data, or the control unit acquires the data by retrieving the data about the piezoelectric elements of the pressure detection unit. That is to say, the control unit acquires the data based on the pressure applied to the touch face of the touch panel. In other words, the control unit acquires, from the pressure detection unit, the data based on the pressure. Then, when the data based on the pressure satisfies a predetermined standard, the control unit may determine that a contact has been made and generate a predetermined vibration. In this regard, the predetermined standard may be appropriately set in accordance with a load characteristic of an intended push-button switch in pressing.

The pressure detection unit as described above may be constituted according to a type of the contact detection employed in the touch panel. For example, in the case of the resistive film type, by associating levels of resistance according to sizes of a contact area with the loads (forces) of the pressure applied to the touch face of the touch panel, the pressure detection unit may be configured without using the strain gauge sensors, piezoelectric elements, and the like. Similarly, in the case of the capacitive type, by associating levels of capacitance with the loads (forces) of the pressure applied to the touch face of the touch panel, the pressure detection unit may be constituted without using the strain gauge sensors, piezoelectric elements, and the like.

Various structures of the pressure detection unit are possible according to the type of the contact detection employed in the touch panel. For example, in the case of the resistive film type, by associating levels of resistance according to sizes of a contact area with the loads (forces) of the pressure applied to the touch face of the touch panel, the pressure detection unit may be configured without using the strain gauge sensors, piezoelectric elements, and the like. Similarly, in the case of the capacitive type, by associating levels of capacitance with the loads (forces) of the pressure applied to the touch face of the touch panel, the pressure detection unit may be constituted without using the strain gauge sensors, piezoelectric elements, and the like.

The vibration unit may also be constituted by using any number of the piezoelectric elements, by providing translucent piezoelectric elements on the entire surface of the touch panel, or by causing an eccentric motor to rotate at a rate of one rotation per period of the drive signal. Additionally, when both the pressure detection unit and the vibration unit are constituted by using the piezoelectric elements, the piezoelectric elements may be used on a shared basis such that an integrated pressure detection and vibration unit is constituted. The reason is that the piezoelectric elements generate voltage in response to pressure applied thereto and are deformed in response to the applied voltage.

As described above, the vibration unit may be configured to generate a vibration by driving the piezoelectric elements when the voltage of the piezoelectric elements, which double as the pressure detection unit, satisfies the predetermined standard. In this regard, the predetermined standard of the voltage (voltage value, i.e. data) of the piezoelectric elements may be satisfied when the voltage value (data) reaches the predetermined standard value, when the voltage value (data) exceeds the predetermined standard value, or when the voltage value (data) equal to the predetermined standard value is detected.

In the description of the above embodiment, it is assumed that the touch panel is superposed over an upper surface of the display unit. However, the electronic device according to the present invention is not limited to the above structure, and the touch panel may be spaced apart from the display unit. It should be noted, however, that superposing the touch panel over the upper surface of the display unit would facilitate it to make the operator perceive a correspondence relation between a displayed image and an area where an operation input is detected and a vibration is generated.

The display unit and the touch panel in the description of the above embodiment may be constituted as an integrated device, for example, by providing a common substrate with functions of both the display unit and the contact detection unit. One example of the device integrating the functions of both the display unit and the contact detection unit includes the one in which a plurality of photoelectric conversion elements such as photodiodes are regularly mixed into a pixel electrode group of a liquid crystal panel that is arranged in a matrix. Such a device is capable of displaying an image according to a liquid crystal panel structure and is also capable of detecting a touch position by reflecting back light for the liquid crystal display with a head of a pen used for inputting, by touch, a desired position on the panel surface so that neighboring photoelectric conversion elements receive the reflected back light.

The vibration unit may be configured to indirectly vibrate the touch panel by vibrating the electronic device based on a vibrating motor (eccentric motor) or the like, or may be configured to directly vibrate the touch panel by providing the piezoelectric elements in the touch panel. In the case of the indirect vibration, when the entire surface of the touch panel is surrounded by the elastic member according to the present invention, the area of the touch panel where the vibration unit is disposed is not excluded from the surrounded surface.

The following describes a mobile phone, which is another example of the electronic device to which the present invention is applicable and is not limited to the illustrated structure. The configuration of a mobile phone 100 may be appropriately modified within the scope that does not affect the application of the present invention.

The other example of the electronic device to which the present invention is applicable are described below with reference to FIGS. 5, 6, and 7.

Figure 5:
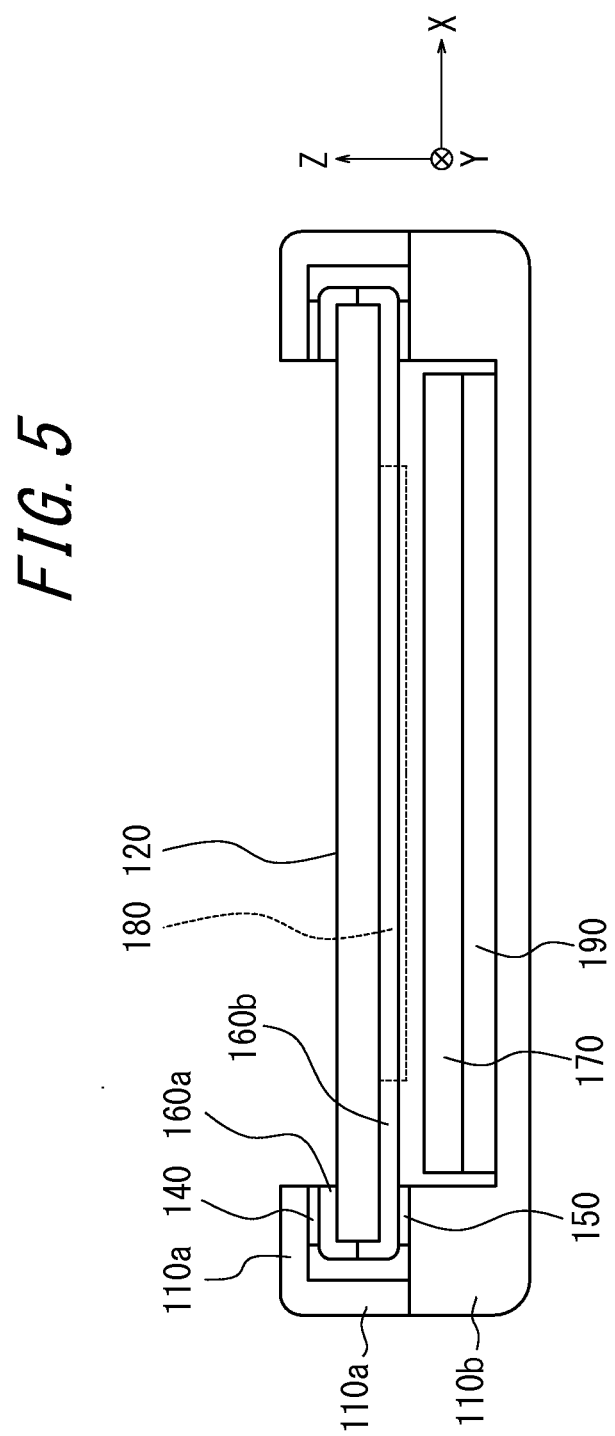
FIG. 5 is a partial sectional view of an electronic device according to another embodiment of the present invention.
Figure 6:
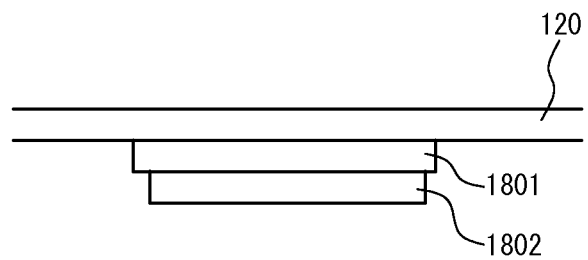
FIG. 6 is a partial sectional view of an electronic device according to yet another embodiment of the present invention.

As illustrated in FIG. 5, the mobile phone as the other example of the electronic device to which the present invention is applicable includes a lower housing 110b for housing a substrate 190 and a display unit 170, and an upper housing 110a configured to be fixed to the lower housing 110b via a waterproof packing or a joining member (not illustrated).

The upper housing 110a includes inside thereof a panel 120 including a piezoelectric element unit 180. The panel 120 is held between a roof portion 110a-2 of the upper housing 110a and an upper surface of the lower housing 110b by an upper and a lower elastic member 160a and 160b and PET sheets 140 and 150 disposed on outer sides of the upper and the lower elastic member 160a and 160b.

The piezoelectric element unit 180 includes a piezoelectric element 1802 and a joining member 1801 for adhering the piezoelectric element 1802 to the panel 120. The panel 120 and the piezoelectric element 1802 each have a substantially oblong shape. In the piezoelectric element unit 180, the piezoelectric element 1802 may be in contact with the joining member 1801 substantially over an entire main surface of the piezoelectric element 1802 on one side thereof. In this case, compared with a case where the piezoelectric element is in contact with the joining member only at both ends of the piezoelectric element, for example, the vibration of the piezoelectric element 1802 is efficiently transferred to the panel 120, whereby the panel 120 is caused to undergo flexure vibration at a sufficiently high intensity to prevent the vibration from being attenuated even when the panel 120 is paced in contact with a human body.

As illustrated in FIG. 5, the display unit 170 is disposed substantially in middle of the panel 120 in a short-side (i.e. lateral) direction thereof. The piezoelectric element 1802 is disposed near longitudinal ends of the panel 120 at a predetermined distance from the longitudinal ends such that longitudinal sides of the piezoelectric element 1802 extend along the lateral sides of the panel 120. Note that the display unit 170 and the piezoelectric element unit 180 may be disposed side by side in a direction parallel with an inner surface of the panel 120. When the panel 120 and the display unit 170 are not superposed, for example, the piezoelectric element unit 180 may be disposed in middle of the panel 120. When the piezoelectric element unit 180 is disposed in middle of the panel 120, the vibration of the piezoelectric element 1802 is evenly transmitted to the whole panel 120, thereby allowing a user to perceive voice even when the user places the ear in contact with the panel 120 at different positions of the panel 120. Note that, as in the case of the aforementioned embodiment, the piezoelectric element may be provided in plurality.

The panel 120, for example in the case where the panel 120 is the touch panel, detects a contact made by the finger, the stylus pen, or the like to the touch panel. The touch panel 20 may detect a contact using any type, such as the capacitive type, the resistive film type, a surface acoustic wave type (or an ultrasonic type), an infrared type, an electromagnetic induction type, a load detection type, and the like. The panel 120 may be a protection panel for protecting the display unit 70. The panel 120 may be made of a material such as glass and synthetic resin and may be in a plate shape.

The display unit 70 is a display device such as the liquid crystal display, the organic EL display, and an inorganic EL display.

The piezoelectric element 1802 of the piezoelectric element unit 180 is an element capable of expansion and contraction in accordance with an electromechanical coupling factor of the constituent material in response to the applied voltage. The piezoelectric element 1802 may be a unimorph, a bimorph, or a laminated-type piezoelectric element. The laminated-type piezoelectric element includes a laminated-type bimorph element with a lamination of (e.g. 16 or 24 layers of) bimorph. In the case of the laminated-type piezoelectric element, the piezoelectric element is constituted by a laminated structure of a plurality of dielectric layers made of PZT (lead zirconate titanate) and electrode layers each disposed between adjacent ones of the dielectric layers, for example.

The joining member 1801 of the piezoelectric element unit 180 is the adhesive agent, the double-sided adhesive tape, or the like having thermosetting properties, ultraviolet curable properties, and the like. For example, an optical elastic resin, which is a colorless and transparent ultraviolet curable acrylic adhesive agent, may be used.

According to the above mobile phone, since the panel 120 is fixed over an entire surface thereof to the elastic members 160a and 160b of the housing 110, the risk that dust or water can enter an inside of the mobile phone is reduced, and moreover, attenuation in the vibration of the panel 120 is reduced.

The mobile phone with the above structure is capable of transmitting sound to the user even when a portion of the user's body is placed in contact with the panel 120 configured to be vibrated due to expansion and contraction of the piezoelectric element unit 180.

The piezoelectric element unit 180 is capable of expansion and contraction (flexure) in the longitudinal direction according to an electric signal output from the control unit which is not illustrated, for example. Since the piezoelectric element 1802 is adhered to the panel 120 with the joining member 1801, the panel 120 is vibrated in conjunction with expansion and contraction of the piezoelectric element unit 180. The vibration is caused in an area of the panel 120 where the piezoelectric element 1802 is disposed and in areas of the panel 120 that are away from the disposed area. The panel 120 is vibrated such that areas with a relatively large amplitude and areas with a relatively small amplitude are distributed randomly across the panel. In other words, the vibration of a plurality of wavelengths is detected across all areas of the panel.

The above mobile phone is capable of causing the panel, such as the touch panel or a cover panel for protecting the display unit, to vibrate by applying the predetermined electric signal (sound signal) to the piezoelectric element and is also capable of transmitting sound to the user by placing a portion of a user's body (e.g. the cartilaginous portion of the external ear) into contact with the vibrated panel.

It is assumed that output sound from the panel of the above mobile phone is voice of a party on the phone, music including a phone melody or a tune, or the like. Music may be reproduced according to music data stored in an internal memory or may be reproduced according to music data stored in an external server and the like via the network.

When sound is output according to the vibration of the panel caused by expansion and contraction of the piezoelectric element, sound in a low frequency range is often more difficult to hear than sound in a high frequency range. Therefore, an amplifier may be controlled to amplify sound simply in the low frequency range.

When sound is transmitted to the user through the vibration of the panel, in a case where there is no need for providing an additional dynamic speaker, it is not necessary to provide the housing with an opening (sound discharge opening) for sound transmission. As a result, the waterproof/dustproof structure of the electronic device is simplified. Note that, however, the dynamic speaker may be additionally provided. In this case, the sound discharge opening of the dynamic speaker is preferably closed by a waterproof sheet (e.g. Gore-Tex™) that passes air through and blocks liquid.

The piezoelectric element causes vibration in the area of the panel where the piezoelectric element is disposed and in the areas of the panel that are away from the disposed area. Accordingly, the user is enabled to listen to sound while placing the ear in contact with the panel in any position. In this regard, by adopting the panel with a larger area than the user's ear, the user can place the electronic device, which is as large as or larger than the user's ear, in contact with the ear such that the whole ear is covered. As a result, the user is enabled to hear sound output from the electronic device while ambient sound (noise) is prevented from entering the external auditory canal. It is suffice for the vibration to occur in an area of the panel that is larger than an area having a length corresponding to a distance from the helix to the tragus and the antitragus and a width corresponding to a distance between the crus of helix and the antihelix. Average ear size of, for example, the Japanese can be seen from the Japanese Body Dimension Database (1992-1994) or the like distributed by the Research Institute of Human Engineering for Quality Life (HQL). Additionally, the panel manufactured using the Japanese ear size as a guide would be applicable to foreigners as well.

Since the above mobile phone is capable of transmitting sound to the user by the vibration through a portion of a user's body (e.g. the cartilaginous portion of the external ear), compared with the dynamic speaker, there is less sound radiated to the environment due to air vibration. Accordingly, the mobile phone is well-suited for a situation where a recorded message is listened to on the train and the like, for example.

Furthermore, since the above mobile phone transmits sound by the vibration of the panel 120, even when the user wears an earphone or a headphone, the user is able to listen to sound though the earphone or headphone and a portion of the body by placing the electronic device in contact with the earphone and the headphone.

Note that in the above mobile phone the display unit 170 and the piezoelectric element unit 180 may be disposed side by side in the direction parallel with the inner surface of the panel 120. In this case, the display unit 170 may be attached to the panel 120 to thereby increase stiffness of a lower portion of the panel 120, so that an upper portion of the panel 120 that is adhered with the piezoelectric element unit 180 may be vibrated more than the lower portion of the panel 120. Consequently, the vibration of the panel 120 is efficiently transmitted to the user.

In transmitting sound by placing the vibrated panel in contact with the human body as mentioned above, the voltage applied to the piezoelectric element is preferably set higher than the voltage applied to a piezoelectric element installed on a typical so-called panel speaker. The reason is that a support structure of the panel relative to the housing differs significantly. For example, in the case of the panel speaker described in Japanese Patent Application Publication No. 2010-114866, the panel itself does not undergo significant deformation, and the panel is supported by the housing, with both ends in a longitudinal direction of the panel being supported by a film member, a rubber member capable of expansion and contraction, a spring member, or the like, such that the entire panel as a whole makes parallel movement in a board thickness direction of the panel. In contrast, in the above mobile phone, the panel 120 is configured to be supported in an entire peripheral portion thereof relative to the housing 110 by means of the elastic member 160 and the PET sheets. That is to say, the panel 120 of the mobile phone 100 is fixed to the housing more firmly than the panel of the panel speaker described in Japanese Patent Application Publication No. 2010-114866. For the above reason, the voltage applied to the piezoelectric element unit 180 of the mobile phone 100 is higher than the voltage applied to the piezoelectric element installed on the typical so-called panel speaker.

Although the mobile phone has been described, a variety of changes are possible regarding the described configuration. FIG. 7 is a partial sectional view of another embodiment of the electronic device to which the present invention is applicable.

Figure 7:
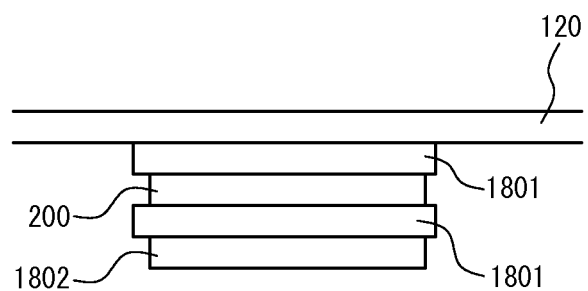
FIG. 7 is yet another partial sectional view of an electronic device according to yet another embodiment of the present invention.

As illustrated in FIG. 7, an intermediate member 200 may be disposed between the piezoelectric element unit 180 and the panel 120. In this case, the piezoelectric element unit 180 and the intermediate member 200 may be adhered together by the joining member 1801, and the intermediate member 200 and the panel 120 are adhered together by the joining member 1801. The joining member 1801 may be the adhesive agent or the double-sided adhesive tape described above.

The intermediate member 200 may be a resin plate, a metal plate, or a resin plate including glass fiber. Owing to the intermediate member 200 disposed between the piezoelectric element unit 180 and the panel 120, when the panel 120 is applied with the external force, the applied external force is less likely to be transferred and to damage the piezoelectric element. By positioning the intermediate member 200 between the piezoelectric element unit 180 and the panel 120, a resonance frequency of the panel 120 is decreased, and sound characteristics in the low frequency range are improved. Note that instead of the intermediate member 200 a plate-shaped weight may be attached to the piezoelectric element unit 180 by the joining member 1801. With the above structure, even when the panel is forcefully pressed against the human body, the attenuation in the vibration of the panel is reduced.

Although in the above mobile phone the piezoelectric element is adhered to the panel, the piezoelectric element may be attached to another area than the panel. For example, the piezoelectric element may be adhered to a battery lid that is configured to be attached to the housing to cover a battery. Since the battery lid is often attached to a surface different from the panel in a mobile phone, the above structure enables the use to listen to sound by placing a portion of a user's body (e.g. the ear) in contact with the surface different from the panel.

The aforementioned electronic device for transmitting sound to the user through a portion of a user's body (e.g. the cartilaginous portion of the external ear) may transmit to the user both of sound (human body conductive sound) that conducts through a portion of the user's body that is in contact with the vibrating panel and air vibration (air conduction sound) that occurs near the panel due to the vibration of the panel.

Although the several embodiments of the present invention have been described, needless to say, the configurations of the embodiments may be combined as appropriate.

REFERENCE SIGNS 1 electronic device
10a, 110a upper housing
10b, 110b lower housing
10a-1, 110a-1 opening of upper housing
10a-2, 110a-2 roof portion
20, 120 touch panel
30, 130 touch panel assembly
40, 140 upper PET member
50, 150 lower PET member
60, 160 elastic member
60a, 160a upper elastic member
60a-1 opening of upper elastic member
60b, 160b lower elastic member
60b-1 opening of lower elastic member
70, 170 display unit
80, 180 vibration unit, piezoelectric element unit
1801 joining member
1802 piezoelectric element
90, 190 substrate
200 intermediate member

The invention claimed is:

1. An electronic device comprising:
a panel;
a vibration unit configured to vibrate the panel; and
an upper housing configured to cover a peripheral portion of an upper surface of the panel, wherein
an inwardly-extending roof portion is provided around a periphery of a top portion of the upper housing,
an upper surface of the panel except for an area of the panel that corresponds to an opening of the upper housing is surrounded by a first elastic member,
a bottom surface of the panel except for an area of the panel where the vibration unit is disposed is surrounded by a second elastic member, the second elastic member having a facing portion facing the roof portion and an extending portion inward from the facing portion that extends from one end of the facing portion to another end of the same in a direction parallel to the upper surface of the panel,
tight contact is established by at least one of:
    between the first elastic member on the peripheral portion of the upper surface of the panel and the roof portion, and
    between the second elastic member on a peripheral portion of a bottom surface of the panel and a support member for the panel, and
the facing portion and the extending portion cover an entire portion of the bottom surface of the panel except for a portion where the vibration unit is disposed.

2. The electronic device of claim 1, wherein
the panel is configured to be as large as to cover a whole ear of a user.

3. The electronic device of claim 1, wherein
the first and the second elastic members are positioned to continuously contact the side surface of the panel and the bottom surface of the panel.

* * * * *